(12) United States Patent
Carpenter

(10) Patent No.: US 11,118,627 B2
(45) Date of Patent: Sep. 14, 2021

(54) THRUST BEARING CAGE WITH SHORTENED FLANGE

(71) Applicant: Koyo Bearings North America LLC, Greenville, SC (US)

(72) Inventor: Trent L. Carpenter, Anderson, SC (US)

(73) Assignee: Koyo Bearings North America LLC, Greenville, SC (US)

( * ) Notice: Subject to any disclaimer, the term of this patent is extended or adjusted under 35 U.S.C. 154(b) by 0 days.

(21) Appl. No.: 16/630,694

(22) PCT Filed: Jul. 21, 2017

(86) PCT No.: PCT/US2017/043319
§ 371 (c)(1),
(2) Date: Jan. 13, 2020

(87) PCT Pub. No.: WO2019/017969
PCT Pub. Date: Jan. 24, 2019

(65) Prior Publication Data
US 2020/0132121 A1    Apr. 30, 2020

(51) Int. Cl.
*F16C 19/30* (2006.01)
*F16C 33/46* (2006.01)
*F16C 33/54* (2006.01)

(52) U.S. Cl.
CPC .......... *F16C 33/547* (2013.01); *F16C 19/305* (2013.01); *F16C 33/4641* (2013.01); *F16C 33/4682* (2013.01)

(58) Field of Classification Search
CPC .. F16C 19/305; F16C 33/4682; F16C 33/583; F16C 33/588; F16C 33/4641
(Continued)

(56) References Cited

U.S. PATENT DOCUMENTS

| 1,380,622 | A | * | 6/1921 | Winn | ............... | F16C 33/48 |
| | | | | | | 384/621 |
| 2,978,282 | A | * | 4/1961 | Fisher | ............ | F16C 33/541 |
| | | | | | | 384/623 |

(Continued)

FOREIGN PATENT DOCUMENTS

| EP | 1418351 B1 * | 1/2014 | ............. F16C 33/48 |
| JP | H0594527 U | 12/1993 | |

(Continued)

OTHER PUBLICATIONS

International Search Report and Written Opinion for International Patent Application PCT/US2017/043319 dated Apr. 16, 2018.

(Continued)

*Primary Examiner* — Marcus Charles
(74) *Attorney, Agent, or Firm* — Nelson Mullins Riley & Scarborough LLP

(57) ABSTRACT

A cage (110) for a roller thrust bearing (100), including a first cage half (120) including an annular portion (122), a first flange (130) extending axially from an inner peripheral edge (124) of the annular portion, and a second flange (132) extending axially from an outer peripheral edge (126) of the annular portion, and a second cage half (140) including an annular portion (142), a first flange (150) extending axially from one of an inner peripheral edge (144) and an outer peripheral edge (146) of the annular portion, a second flange (152) extending both axially and radially from the other of the inner peripheral edge and the outer peripheral edge, the second flange including a first flange portion (154) and a second flange portion (156), wherein the second flange portion of the second flange of the second cage half is disk-shaped and is disposed in a plane that is transverse to a longitudinal center axis of the roller retainer cage.

12 Claims, 5 Drawing Sheets

(58) Field of Classification Search
USPC .................................. 384/619, 622, 623, 621
See application file for complete search history.

(56) References Cited

U.S. PATENT DOCUMENTS

| | | | |
|---|---|---|---|
| 3,913,994 A | 10/1975 | Ailing et al. | |
| 3,994,546 A * | 11/1976 | Alling | F16C 19/305 |
| | | | 384/623 |
| 4,910,847 A * | 3/1990 | Christenson | F16C 19/30 |
| | | | 29/437 |
| 6,036,373 A * | 3/2000 | Faass | F16C 19/30 |
| | | | 384/620 |
| 6,102,580 A * | 8/2000 | Alling | F16C 19/30 |
| | | | 384/470 |
| 6,883,970 B2 * | 4/2005 | Horley | F16C 19/305 |
| | | | 384/623 |
| 7,033,083 B2 * | 4/2006 | Obayashi | F16C 33/48 |
| | | | 384/619 |
| 7,273,318 B2 * | 9/2007 | Hayashi | F16C 19/305 |
| | | | 384/623 |
| 7,398,724 B2 * | 7/2008 | Obayashi | F04B 27/1063 |
| | | | 92/71 |
| 8,448,430 B2 * | 5/2013 | Fukami | F16C 19/30 |
| | | | 60/361 |
| 9,541,132 B2 * | 1/2017 | Brown | F16C 33/547 |
| 2003/0198423 A1 * | 10/2003 | Horley | F16C 33/4641 |
| | | | 384/623 |

FOREIGN PATENT DOCUMENTS

| | | | | |
|---|---|---|---|---|
| JP | H0667923 U | | 9/1994 | |
| JP | 2012127389 A | | 7/2012 | |
| JP | 2014181792 A | * | 9/2014 | .......... F16C 33/4605 |
| WO | WO-2013042512 A1 | * | 3/2013 | .......... F16C 33/4641 |
| WO | WO-2019089058 A1 | * | 5/2019 | .............. F16C 33/56 |

OTHER PUBLICATIONS

International Preliminary Report on Patentability, PCT/US2017/043319, dated Jan. 21, 2020, 7 pages.

* cited by examiner

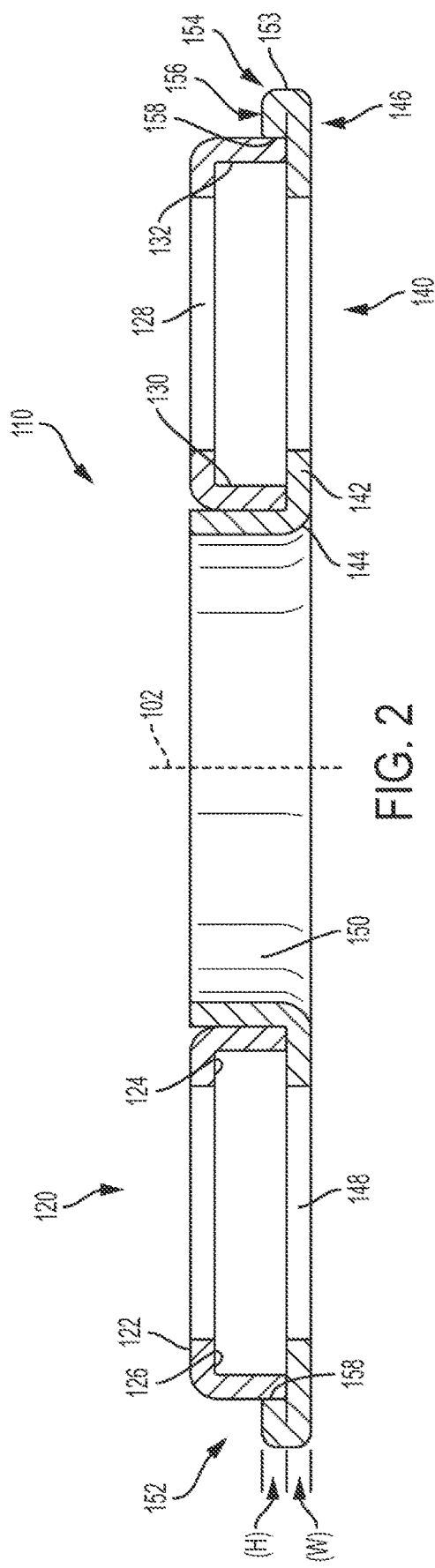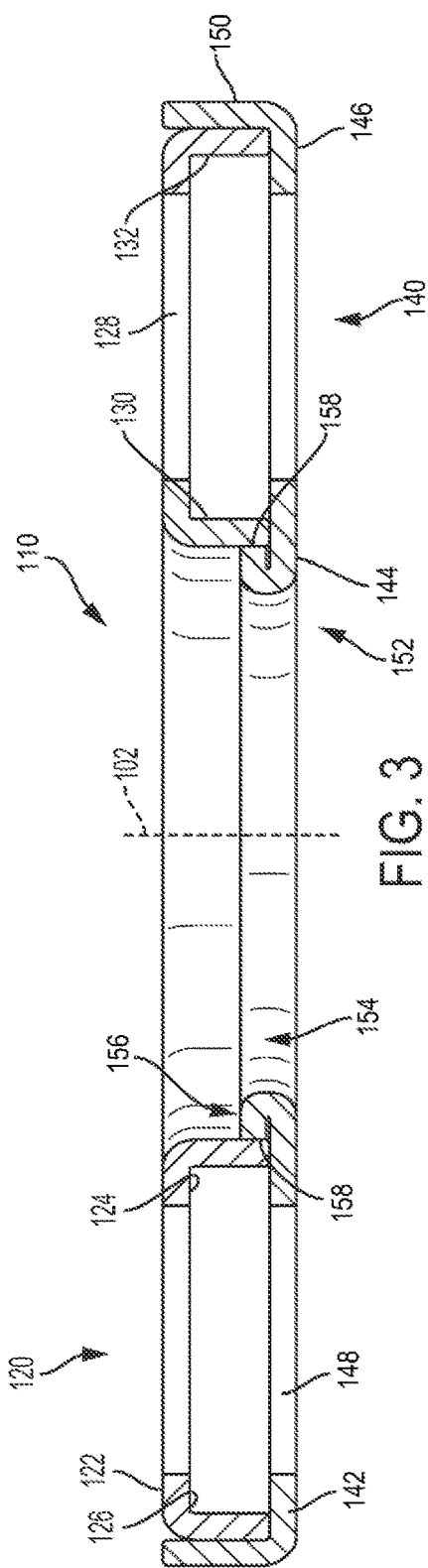

THRUST BEARING CAGE WITH SHORTENED FLANGE

RELATED APPLICATION

This is a 35 U.S.C. § 371 national stage application of PCT/US2017/043319, filed Jul. 21, 2017, the entire disclosure of which is incorporated herein.

FIELD OF THE INVENTION

The present invention relates generally to roller thrust bearings. More particularly, the present invention relates to a two-piece cage for use in a roller thrust bearing.

BACKGROUND OF THE INVENTION

Often, roller thrust bearings with flush mounted raceways require a shortened lip or flange feature on the roller cage 10, as shown in FIGS. 5 and 6, to be utilized with any race retention feature, such as an angled flange 42, that may be present on the raceway. As best seen in FIG. 6, cage 10 includes a first cage half 12 and a second cage half 22 that are unified by angled flanges 42 and 52 on raceways 40 and 50 that are formed by an additional forming step. As shown, first cage half 12 includes an annular portion 14 including a first annular flange 16 and a second annular flange 18 extending axially therefrom, one each from the inner and outer peripheral edges of annular portion 14. Similarly, second cage half 22 includes an annular portion 24 and a first annular flange 26 and a second annular flange 28 extending axially therefrom, one each from the inner peripheral edge and the outer peripheral edge of annular portion 24. Each of annular portions 14 and 24 defines a plurality of roller pockets 20 and 30, respectively, that are configured to work in tandem to rotatably receive a plurality of roller elements (not shown).

Referring now to FIG. 6, cage 10 and a corresponding plurality of rollers 11 are disposed between first raceway 40 and second raceway 50. As shown, first raceway 40 is a flush mount design, whereas second raceway 50 is a standard, non-flush mount, design. As such, angled flange 42 of first raceway 40 does not extend beyond the axial width (W) of cage 10. In that first raceway 40 is a flush mount design, the height (h) of second annular flange 28 is minimized to provide the required clearance for angled flange 42. In contrast, as second flange 50 is a standard design raceway, the height of its first annular flange 26 need not be minimized since angled 52 is free to extend beyond the axial width (W) of angle 10.

Potential issues may arise when the specified use for a roller retainer cage, i.e. flush mounting, dictates a flange height requirement that approaches, or is less than, two times the material thickness, or width (W), being used to form the flange. For example, as shown in FIG. 5, the height (h) of second flange 28 of second cage half 22 is substantially equal to the width (W) of the material from which the second annular flange is being formed. Ideally, the height (h) of second annular flange 28 would equal or exceed at least twice the width (W) of the materials being used to form the flange. When the height requirement of the desired flange does not meet the noted forming rule, it may be difficult to achieve a uniform height for the flange around the perimeter of the corresponding cage half. As well, such shortened flanges may contribute to the corresponding cage half exhibiting low stiffness, thereby being easily bent, damaged, or destroyed during subsequent processing. Moreover, such shortened flanges provide minimal piloting surface on the inner and/or outer perimeters of the corresponding cage.

The present invention recognizes and addresses considerations of prior art constructions and methods.

SUMMARY OF THE INVENTION

One embodiment of the present invention provides a cage for a roller thrust bearing including a first cage half including an annular portion, a first flange extending axially from an inner peripheral edge of the annular portion, and a second flange extending axially from an outer peripheral edge of the annular portion, and a second cage half including an annular portion, a first flange extending axially from one of an inner peripheral edge and an outer peripheral edge of the annular portion, a second flange extending both axially and radially from the other of the inner peripheral edge and the outer peripheral edge, the second flange including a first flange portion and a second flange portion, wherein the second flange portion of the second flange of the second cage half is disk-shaped and is disposed in a plane that is transverse to a longitudinal center axis of the cage.

Another embodiment of the present invention provides a cage for a roller thrust bearing including a first cage half including an annular portion, a first flange extending axially from an inner peripheral edge of the annular portion, and a second flange extending axially from an outer peripheral edge of the annular portion, a second cage half including an annular portion, a first flange extending axially from one of an inner peripheral edge and an outer peripheral edge of the annular portion, a second flange extending both axially and radially from the other of the inner peripheral edge and the outer peripheral edge, the second flange including a first flange portion and a second flange portion, wherein the second flange of the second cage half extends either radially inwardly or radially outwardly toward an outer surface of one of the first flange and the second flange of the first cage half.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which;

FIG. 2 is a cross-sectional view of the two-piece cage for a roller thrust bearing shown in FIG. 1, taken along line 2-2;

FIG. 3 is a cross-sectional view of a two-piece cage for use in a roller thrust bearing, in accordance with an alternate embodiment of the present invention;

Figure 1:
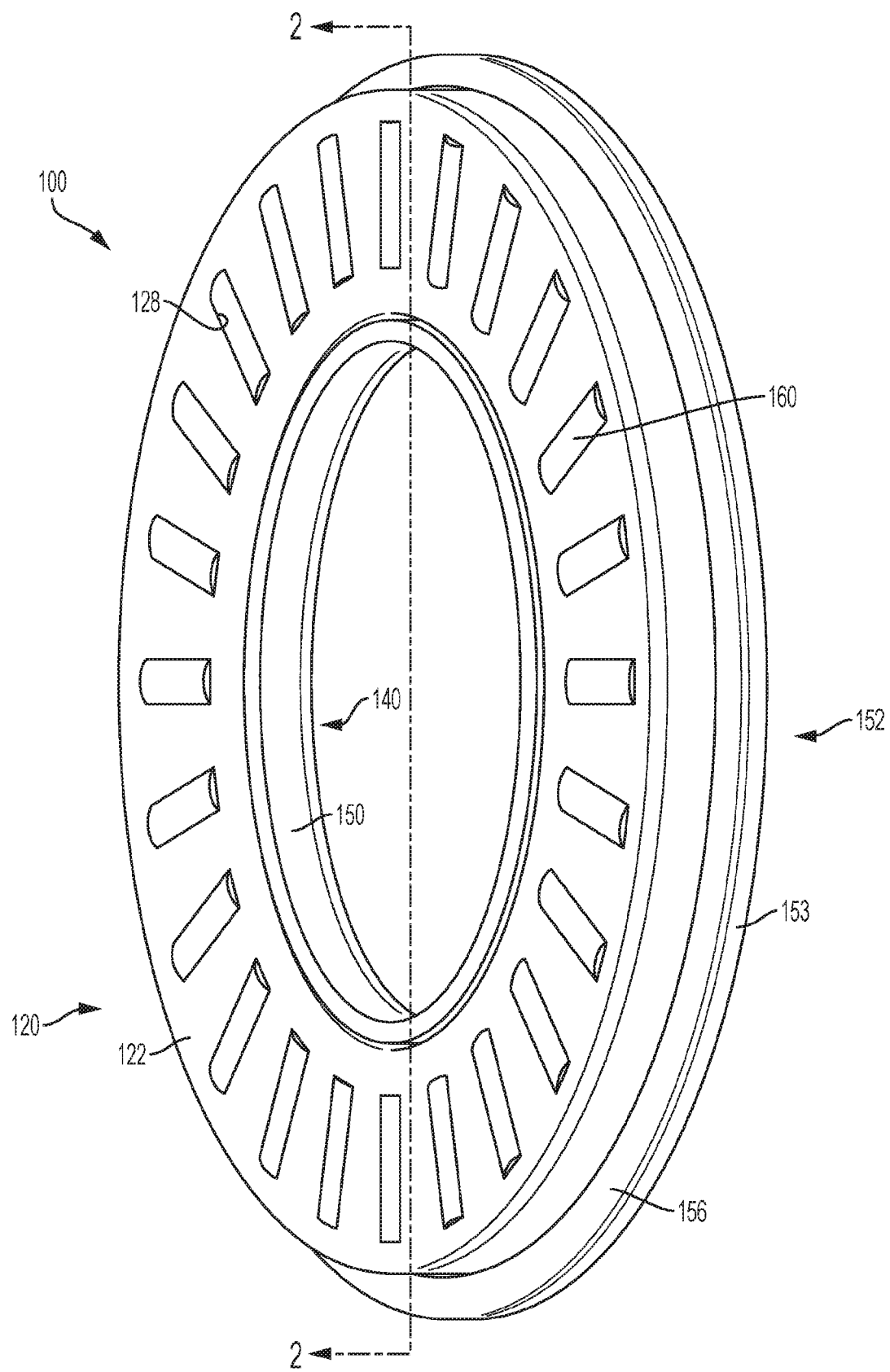
FIG. 1 is a perspective view of a roller thrust bearing including a two-piece cage, in accordance with an embodiment of the present invention.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 4:
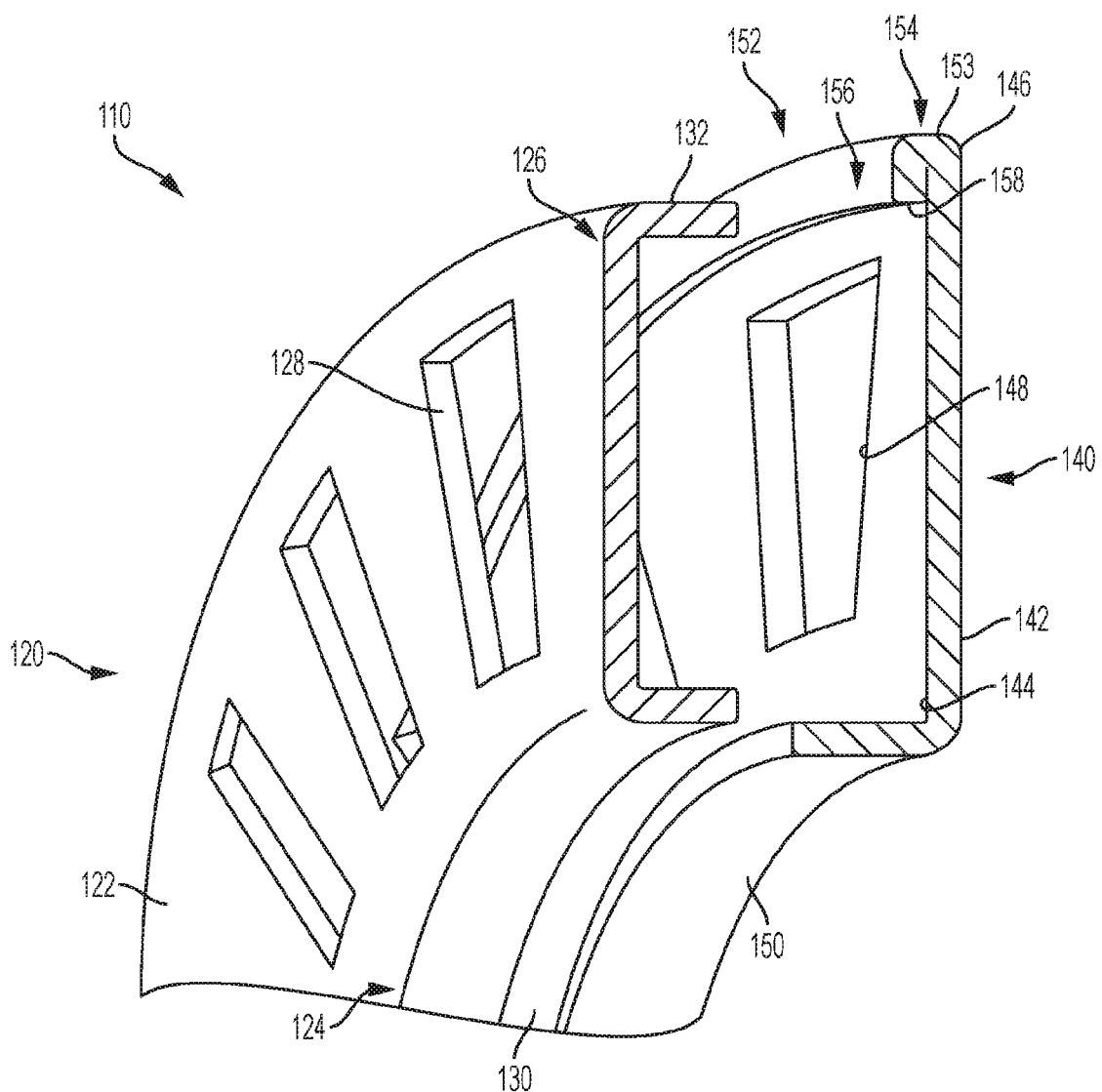
FIG. 4 is a partial cross-sectional view of the two-piece cage as shown in FIGS. 1 and 2.
Figure 5:
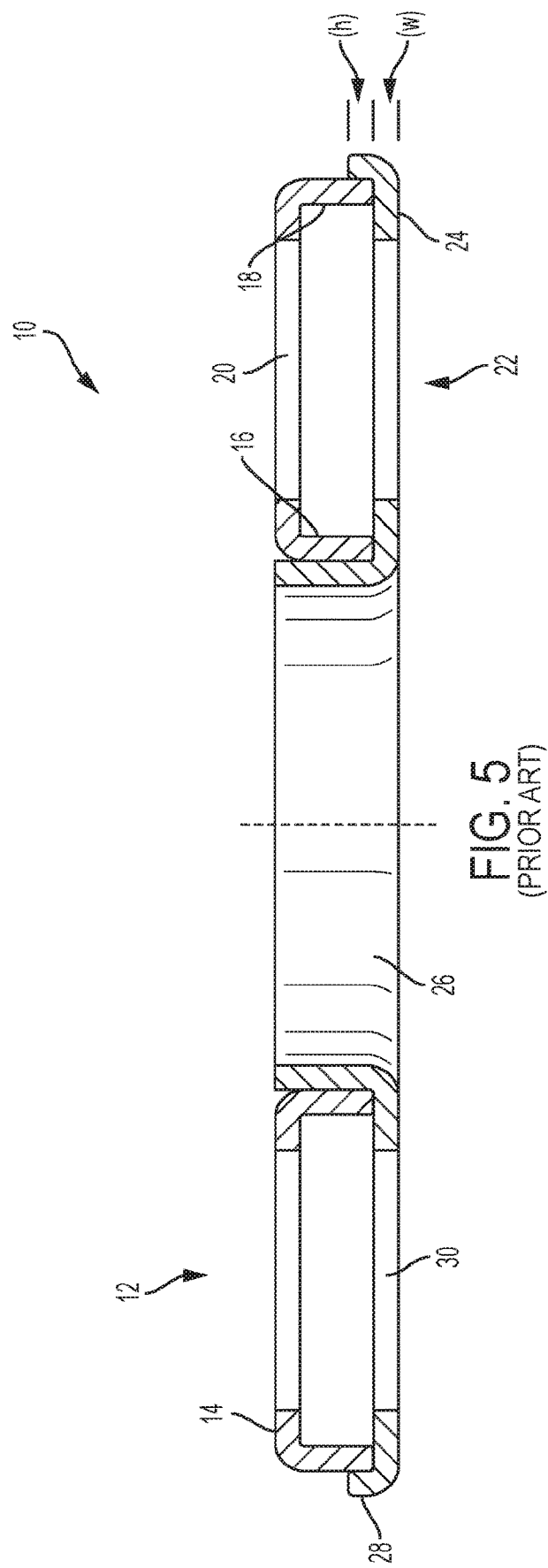
FIG. 5 is a cross-sectional view of a prior art two-piece cage for a roller thrust bearing.
Figure 6:
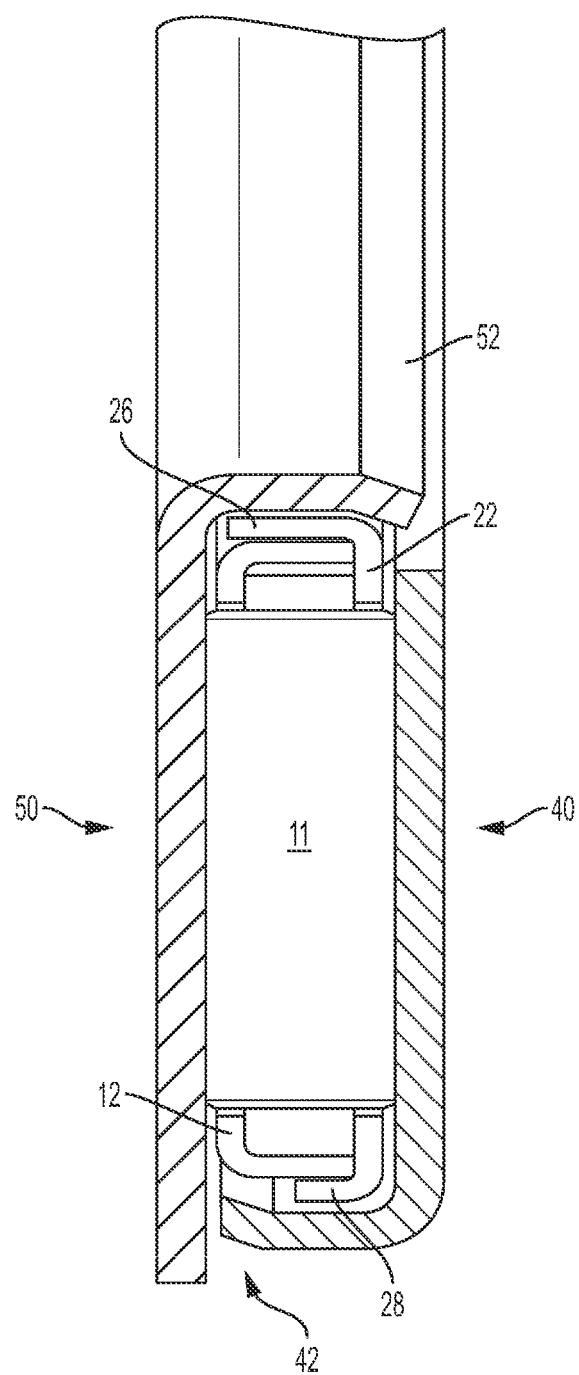
FIG. 6 is a partial cross-sectional view of a prior art roller thrust bearing including the two-piece cage shown in FIG. 5.

Referring now to the figures, a roller thrust bearing 100 in accordance with the present invention includes a roller retainer cage 110 formed by a first cage half 120 and a second cage half 140, and a plurality of roller elements 160 rotatably received therebetween as best seen in FIGS. 1, 2 and 4. First cage half 120 includes an annular portion 122 defining a first plurality of roller pockets 128, a first annular flange 130 extending axially (parallel to longitudinal center axis 102) from its inner peripheral edge 124, and a second annular flange 132 extending axially from its outer peripheral edge 126. Annular portion 122 of first cage half 120 is substantially disc-shaped, with inner peripheral edge 124 and outer peripheral edge 126 being substantially concentric about the longitudinal center axis 102 of roller retainer cage 110. As shown, first annular flange 130 and second annular flange 132 are preferably of the same height and concentric about longitudinal center axis 102 as well. Of note is the fact that the heights of first annular flange 130 and second annular flange 132 are such that they exceed two times the width (W) of the material from which they are formed.

As shown, second cage half 140 includes an annular portion 142 defining a first plurality of roller pockets 148, a first annular flange 150 extending axially (parallel to longitudinal center axis 102) from its inner peripheral edge 144, and a second annular flange 152 extending axially from its outer peripheral edge 146. Annular portion 142 of second cage half 140 is substantially disc-shaped, with inner peripheral edge 144 and outer peripheral edge 146 being substantially concentric about longitudinal center axis 102 of roller retainer cage 110. As shown, unlike first cage half 120, first annular flange 150 and second annular flange 152 differ in height although they are concentric about longitudinal center axis 102. The height of first annular flange 150 exceeds two times the width (W) of the material from which it is formed.

As best seen in FIG. 4, second annular flange 152 of second cage half 140 includes a first flange portion 154 that extends in the axial direction parallel to longitudinal center axis 102, and a second flange portion 156 that extends radially inwardly from first flange portion 154 toward longitudinal center axis 102. Second flange portion 156 includes an inner peripheral edge 158 that preferably abuts an outer surface of second annular flange 132 of first cage half 120 when roller retainer cage 110 is assembled, as shown in FIG. 2. Note, in alternate embodiments, second flange portion 156 is substantially disc-shaped and lies in a plane that is both perpendicular to longitudinal center axis 102 of roller retainer cage 110 and parallel to a plane in which annular portion 142 of second cage half 140 lies. Frictional engagement between first annular flanges 130 and 150 of first and second cage halves 120 and 140, respectively, and frictional engagement between inner peripheral edge 158 of second annular flange 152 of second cage half 140 and the outer surface of second annular flange 132 of first cage half 120 maintain the cage halves in a unitary construction. As shown in FIG. 3, in an alternate embodiment of roller retainer cage 110, an outer peripheral edge 158 of the second flange portion 156 of the second flange 152 of the second cage half 140 abuts the outer surface of the first flange 130 of the first cage half 120, wherein second flange 152 is disposed inwardly of first flange 150. Alternately, first cage half 120 and second cage half 140 may be welded or crimped together for certain uses.

As best seen in FIGS. 2 and 4, because second annular flange 152 of second cage half 140 is formed by folding material into a plane that is transverse to longitudinal center axis 102, the overall height (H) of second annular flange 152 can be approximately equal to the width (W) of the material used to form flange. This construction allows minimum height requirements to be maintained for clearance purposes of other features, such as but not limited to retention features, yet the flange can initially be made a height that exceeds two times the material width (W) prior to folding the material inwardly. Specifically, when forming second annular flange 152, an axially extending (parallel to longitudinal center axis 102) annular flange is first formed that has a height equal to at least two times the width (W) of the material. Next, the annular flange is folded inwardly to form second flange portion 156. As such, second annular flange 152 of the present invention can be formed without falling prey to the disadvantages that are known to exist when axially extending flanges of known roller retainer cages are formed at a height that does not equal or exceed two times the material thickness from which they are formed. Note, first flange portion 154 and second flange portion 156 can be further coined such that second annular flange 152 is thinner than two times the width (W) of the material, yet maintains improved stiffness for second cage half 140. Note, coining of first flange portion 154 and second flange portion 156 can be used to increase the piloting surface area as the extent to which the flange extends radially is increased. As well, coining may also be used on first flange portion 154 and second flange portion 156 to produce a cylindrical outermost surface 153 on second annular flange 152 for piloting purposes.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A cage for a roller thrust bearing, comprising:
   a first cage half including an annular portion, a first flange extending axially from an inner peripheral edge of the annular portion, and a second flange extending axially from an outer peripheral edge of the annular portion; and
   a second cage half including an annular portion, a first flange extending axially from one of an inner peripheral edge and an outer peripheral edge of the annular portion, a second flange extending both axially and radially from the other of the inner peripheral edge and the outer peripheral edge, the second flange including a first flange portion and a second flange portion,
   wherein the second flange portion of the second flange of the second cage half is disk-shaped, is disposed in a plane that is transverse to a longitudinal center axis of the roller retainer cage, and extends radially toward the first flange of the second cage half.

2. The cage of claim 1, wherein an inner peripheral edge of the second flange portion of the second flange of the second cage half abuts an outer surface of one of the first flange and the second flange of the first cage half.

3. The cage of claim 2, wherein the first flange and the second flange of the first cage half are cylindrically shaped.

4. The cage of claim 3, wherein the first flange of the second cage half is cylindrically shaped.

5. The cage of claim 1, wherein the first flange portion of the second flange of the second cage extends axially from the annular portion of the second cage half to the second flange portion of the second flange of the second cage half.

6. The cage of claim 5, wherein the second flange portion of the second flange of the second cage half extends radially inwardly from the first flange portion toward the longitudinal center axis of the cage.

7. The cage of claim 1, wherein the annular portion of the first cage half and the annular portion of the second cage half both define a plurality of roller pockets configured to rotatably receive a plurality of roller elements.

8. The cage of claim 1, wherein the second flange of the second cage half is disposed on the inner peripheral edge of the annular portion of the second cage half.

9. The cage of claim 1, wherein the second flange of the second cage half is disposed on the outer peripheral edge of the annular portion of the second cage half.

10. A cage for a roller thrust bearing, comprising:
a first cage half including an annular portion, a first flange extending axially from an inner peripheral edge of the annular portion, and a second flange extending axially from an outer peripheral edge of the annular portion; and
a second cage half including an annular portion, a first flange extending axially from one of an inner peripheral edge and an outer peripheral edge of the annular portion, a second flange extending both axially and radially from the other of the inner peripheral edge and the outer peripheral edge,
wherein the second flange of the second cage half extends either radially inwardly or radially outwardly toward an outer surface of one of the first flange and the second flange of the first cage half, and
wherein an inner peripheral edge of the second flange portion of the second flange of the second cage half abuts an outer surface of one of the first flange and the second flange of the first cage half.

11. The cage of claim 10, wherein the annular portion of the first cage half and the annular portion of the second cage half both define a plurality of roller pockets configured to rotatably receive a plurality of roller elements.

12. The cage of claim 10, wherein the second flange of the second cage half includes a first flange portion and a second flange portion, and the first flange portion extends axially from the annular portion of the second cage half to the second flange portion.

\* \* \* \* \*